United States Patent
Lee et al.

(10) Patent No.: US 8,483,451 B2
(45) Date of Patent: Jul. 9, 2013

(54) METHOD FOR FACE RECOGNITION AND SYNTHESIS

(75) Inventors: Ping-Han Lee, Taipei (TW); Yi-Ping Hung, Taipei (TW)

(73) Assignee: National Chiao Tung University, Hsinchu (TW)

( * ) Notice: Subject to any disclaimer, the term of this patent is extended or adjusted under 35 U.S.C. 154(b) by 852 days.

(21) Appl. No.: 12/624,915

(22) Filed: Nov. 24, 2009

(65) Prior Publication Data

US 2010/0303343 A1   Dec. 2, 2010

(30) Foreign Application Priority Data

May 26, 2009   (TW) ................................ 98117549 A

(51) Int. Cl.
*G06K 9/00*   (2006.01)
(52) U.S. Cl.
USPC ............................ 382/118; 382/224; 382/225
(58) Field of Classification Search
USPC ................... 382/118, 224, 225, 253
See application file for complete search history.

(56) References Cited

U.S. PATENT DOCUMENTS

| 7,054,468 | B2 | 5/2006 | Yang | |
|---|---|---|---|---|
| 7,203,346 | B2 | 4/2007 | Kim et al. | |
| 8,031,914 | B2 * | 10/2011 | Zhang | 382/118 |
| 2004/0213454 | A1 * | 10/2004 | Lai et al. | 382/159 |
| 2006/0088212 | A1 * | 4/2006 | Ohmi et al. | 382/170 |

FOREIGN PATENT DOCUMENTS

| TW | 397948 | 5/1993 |
|---|---|---|
| TW | 094126661 | 8/1994 |
| TW | 311209 A | 7/1997 |
| TW | I308300 A | 4/2009 |

OTHER PUBLICATIONS

Chen et al. A VQ-Based Fast Face REcognition Algorithm Using Optimized Codebook, 2008, IEEE.*
Cheng et al., Robust 3d Face Recognition Using Learned Visual Codebook, 2007, IEEE.*
Jurie et al., Creating Efficient Codebooks for Visual Recognition, 2005.*

* cited by examiner

*Primary Examiner* — John Strege

(57) ABSTRACT

A method of recognizing an object in an image is provided, the method comprises the following steps. The image having the object is provided, and principal traits of the object are encoded in order to generate a first trait code. The first trait code is compared with data stored in a database so as to obtain a plurality of differences. A minimum of the plurality of differences is found. This method can be applied to synthesize human faces.

20 Claims, 4 Drawing Sheets

Fig. 1

METHOD FOR FACE RECOGNITION AND SYNTHESIS

FIELD OF THE INVENTION

The present invention relates to a method for face recognition and synthesis, and more particularly to a method applying Facial Trait Code to face recognition and synthesis

BACKGROUND OF THE INVENTION

Presently, the technique of face recognition and synthesis is mainly used in the security and monitoring industries. This technique can be used in aspects including personal computer, mobile phone, entering or existing Customs, public monitor or vault of the bank to protect the operation of system or prevent intentional fraud from the dangerous person.

Taiwan patent application No. 094126661 discloses a face recognition method based on five basic facial features therein. In this Patent, the five basic facial features are found out and classified to compare with the database, and then the recognizing result is determined. However, the method proposed by the patent simply uses the human instinct to select the five basic facial features of human face, which may not have the best discriminating capability. Therefore, it is possible to select a better set of facial features and improve the recognition accuracy.

Taiwan Patent No. 397,948 discloses a method of electronic synthesis of face image production and the apparatus thereof. The patent defines several basic face shapes and amends certain sections on the basic face shape, which means that by choosing different components such as eyes, mouths or noses to synthesize and make a human face. Similarly, these components intuitionally defined by human instinct are not the representative components with the most discrimination property on human face, so that the result acquired is limited.

U.S. Pat. No. 7,054,468 discloses a face recognition method using Kernel Linear Discriminant Analysis. The method reduces the dimension of characteristic vector of a human face to a lower dimensional space, and compares it with the characteristic vector. However, the method that directly converts the human face down to the vector is too rough. A slight difference on the face would lead to the gigantic divergence between the vectors. Besides, this method will result in too much load when performing the comparison calculation, and cost too much time and resources.

In addition, U.S. Pat. No. 7,203,346 discloses a face recognition method according to the facial components and the apparatus thereof. The facial components are still predefined by human; the patent uses weighted method to determine the similarity between two faces. Yet the way of definition would be still subjective, and the recognition accuracy cannot be effectively elevated.

Therefore, the abovementioned prior art not only take time when calculating, but also remain inaccurate to the acquired result. There are still a lot of difficulties and inconveniencies in the practical application.

In order to overcome the drawbacks exist in the prior art, a methods for face recognition and synthesis is provided. The particular design in the present invention not only solves the problems described above, but also is easy to be implemented. Thus, the present invention has the utility for the industry.

SUMMARY OF THE INVENTION

In accordance with an aspect of the present invention, a method of recognizing an object in an image is provided, the method comprises steps of providing the image having the object, and encoding principal traits of the object in order to generate a first trait code; comparing the first trait code with data stored in a database so as to obtain a plurality of differences; and finding a minimum of the plurality of differences.

Preferably, the method further comprises a step of constructing the database including collecting K images, wherein each object in each of the K images has M traits; classifying patches belonging to each of the M traits so that the patches of each trait of the K objects is classified into $k_i$; trait patterns, wherein i=1, 2, ..., M, and $k_i \leq K$; extracting N principal traits from the M traits, wherein each principal trait includes classified $k_j$ trait patterns, and wherein j=1, 2, ..., N, and $k_j \leq K$; constructing a code book based on the N principal traits and the $k_j$ trait bases; and providing of a plurality of comparison objects, and encoding the principal traits of each of the comparison objects based on the code book in order to generate a respective second trait code for the each comparison object.

Preferably, each of the first and the second trait codes is a vector, each of whose elements can be an integer or a distribution.

Preferably, each of the differences is a distance between the first and the second trait codes, and the distance comprises one selected from a group consisting of the Hamming distance, Euclidean distance and Bhattacharyya distance.

Preferably, the first and the second trait codes are encoded by a classifier.

Preferably, the principal trait is a region expressed as {w, h, x, y}, w is a width, h is a height, x and y are the horizontal and the vertical coordinates of the upper left corner of the rectangle on an image, respectively.

In accordance with another aspect of the present invention, a method for representing an object in an image is provided, the method comprises steps of providing a plurality of patches; providing a trait code being a serial code having at least a value; finding at least two of the patches corresponding to each of the values in the serial code; and combining the corresponding patches.

Preferably, the method further comprises a step of constructing a database including the plurality of patches, comprising sub-steps of collecting K images, wherein each object in each of the K images has M traits; classifying each trait of the M traits so that the each trait of the K objects is classified into $k_i$ trait patterns, wherein i=1, 2, ..., M, and $k_i \leq K$; extracting N principal traits from the M traits, wherein each principal trait includes classified $k_j$ trait patterns, and wherein j=1, 2, ..., N, and $k_j \leq K$; and constructing a code book based on the N principal traits and the $k_j$ trait patterns.

Preferably, the principal trait is a region expressed as {w, h, x, y}, w is a width, h is a height, x and y are the horizontal and the vertical coordinates of the upper left corner of the rectangle on an image, respectively.

Preferably, each of the first and the second trait codes is a vector, each of whose elements can be an integer or a distribution.

Preferably, the step of combining the corresponding patches further comprises a step of performing an image processing for the corresponding patches.

In accordance with further aspect of the present invention, a method of training a trait code is provided, the method comprises steps of collecting K images having an object respectively, each object has M traits; classifying each of the M traits so that the each trait of the K objects is classified into $k_i$; trait patterns, wherein i=1, 2, ..., M, and $k_i \leq K$; and extracting N principal traits from the M traits, wherein each of the principal traits includes classified $k_j$ traits patterns, and wherein j=1, 2, ..., N, and $k_j \leq K$.

Preferably, the method further comprises steps of constructing a code book based on the N principal traits and the $k_j$ trait patterns; and providing of a plurality of comparison objects, and encoding the principal traits of each of the comparison objects based on the code book in order to generate the respective trait code for the each comparison object.

Preferably, the trait code is a serial code having at least a value being a natural number.

Preferably, the trait code is encoded by classifiers.

Preferably, the principal trait is a region expressed as {w, h, x, y}, w is a width, h is a height, x and y are the horizontal and the vertical coordinates of the upper left corner of the rectangle on an image, respectively.

In accordance with further aspect of the present invention, a recognizing and composing system of an object in an image is provided. The system comprises a database having a datum; a sensor receiving a first image; a set of classifiers classifying and encoding a first object in the first image; and a processor comparing the result of encoding with the datum of the database.

Preferably, the database comprises a code book.

Preferably, wherein the classifier generates a first trait code for the first object based on the code book, and the first trait code is stored in the database.

Preferably, the sensor further receives plural images, the classifiers generate plural trait codes for each of the plural objects in the plural images respectively based on the code book, and the processor compares the first trait code with each of the plural trait codes to find differences and a minimum of the differences.

Preferably, each of the differences is a distance between the first and the each trait code, and the distance comprises one selected from a group consisting of the Hamming distance, Euclidean distance or Bhattacharyya distance.

Preferably, each of the first and the second trait codes is a vector, each of whose elements can be an integer or a distribution.

Preferably, the serial code has a length within 60 bits.

Preferably, the system further comprises a decoder decoding a second trait code based on the code book to generate a second image having a second object; and a monitor outputting the second image.

Preferably, the system further comprises a second processor modifying the second image.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 1 is a schematic diagram showing the code book in the present invention;

DETAILED DESCRIPTION OF THE PREFERRED EMBODIMENT

Figure 2:
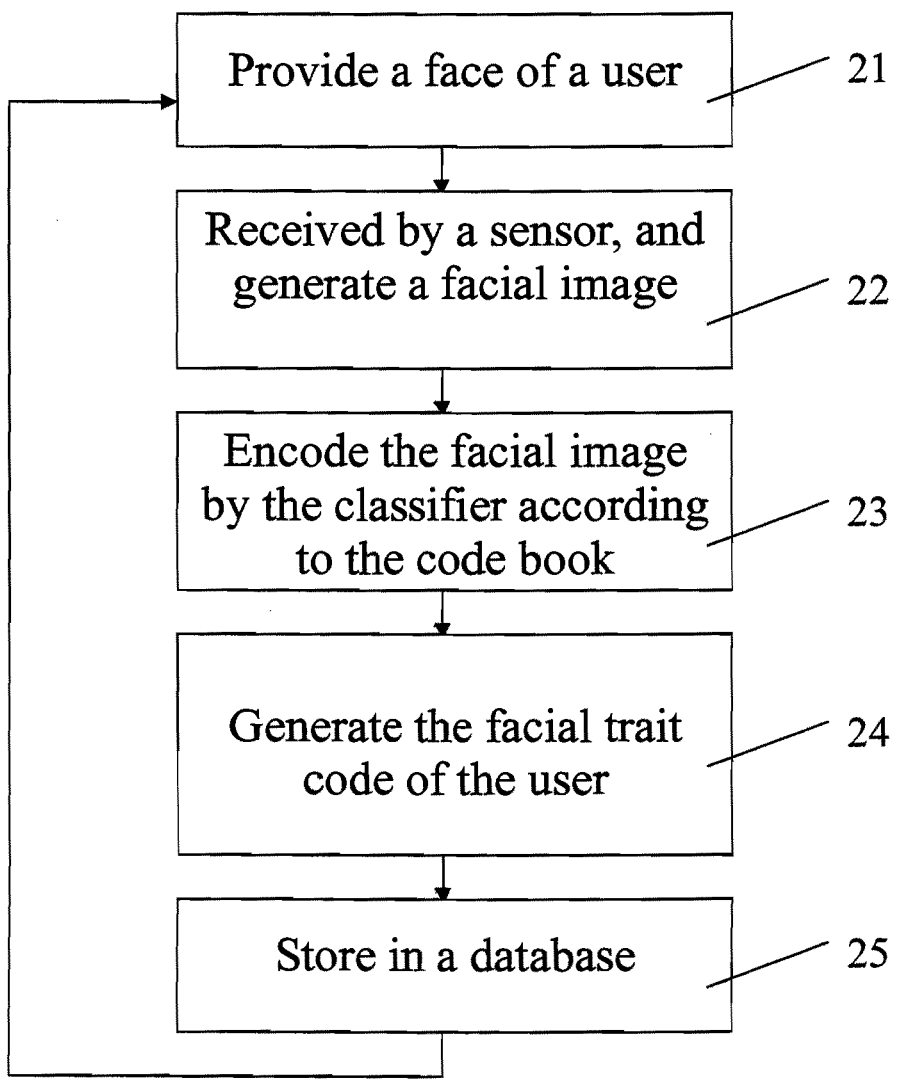
FIG. 2 is a flowchart showing part of the steps in the present invention.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention is based on the concept of facial trait code, by applying Adaboost algorithm to classify the human face into N most discriminating local features. These N local features constitute our so-called Facial Trait Code, which is a serial code composed of N number digits. By applying the Facial Trait Code, effectively recognize human face or synthesize a human face in contrast could be realized.

Before practically applying the Facial Trait Code to perform recognition, it is necessary to train the structure of Facial Trait Code at first, i.e., to construct a code book stored in a database. Firstly, K human faces are collected, wherein each of the K human faces has M traits. Each trait expresses a region on human face, that is to say, we could classify each human face as M regions. The expression of each region could be defined as {w, h, x, y}, wherein w is the width, h is the height, x and y are the horizontal and the vertical coordinates of the upper left corner of the rectangle on an image, respectively. As a result, the area covered by each region could be different, and could also be overlapped.

Next the M traits are clustered. In the present embodiment, the algorithm "unsupervised learning of finite mixture models, PAMI, 24 (2002) 381-396" proposed by M. Figueiredo and A. Jain et al is used to cluster for forming clusters. Each cluster includes a trait and $k_j$ trait patterns corresponding to the trait, wherein i=1, 2, . . . , M, and $k_j \leq K$.

The purpose of the present invention is to propose a method which can accurately recognize human face and perform synthesis thereof. More specifically, the method of the face recognition and synthesis proposed by the present invention has an ability of fault tolerance. After all, the recognition and the comparison of human faces cannot make 100% conformity. The faces belong to the same person can be recognized as different people. This could be resulted from the fact that when being tested, the light variation in the environment, the sensing ability of machine or even change on facial expression and differences of appearance to the time before and after. Therefore, even though two recognized results are different, it is still possible to correctly determine in an allowable range that the recognition results of two faces express the same person.

According to the theory of Error Correcting Code, the Minimum Hamming Distance $d_{min}$ means that there is a minimal difference between any two binary codes. And $(d_{min}-1)/2$ can be considered as the range outside a binary code, and those located in that range can be corrected to the binary code. Therefore, the larger $d_{min}$, the larger difference between each code, and also the larger range, so that the stronger the ability of the fault tolerance.

Herein N principal traits that can maximize $d_{min}$ from the M traits according to Adaboost algorithm are extracted. These N principal traits stand for the traits that have the best error-correcting ability, and also the principal traits have the best discriminating ability.

Figure 1:
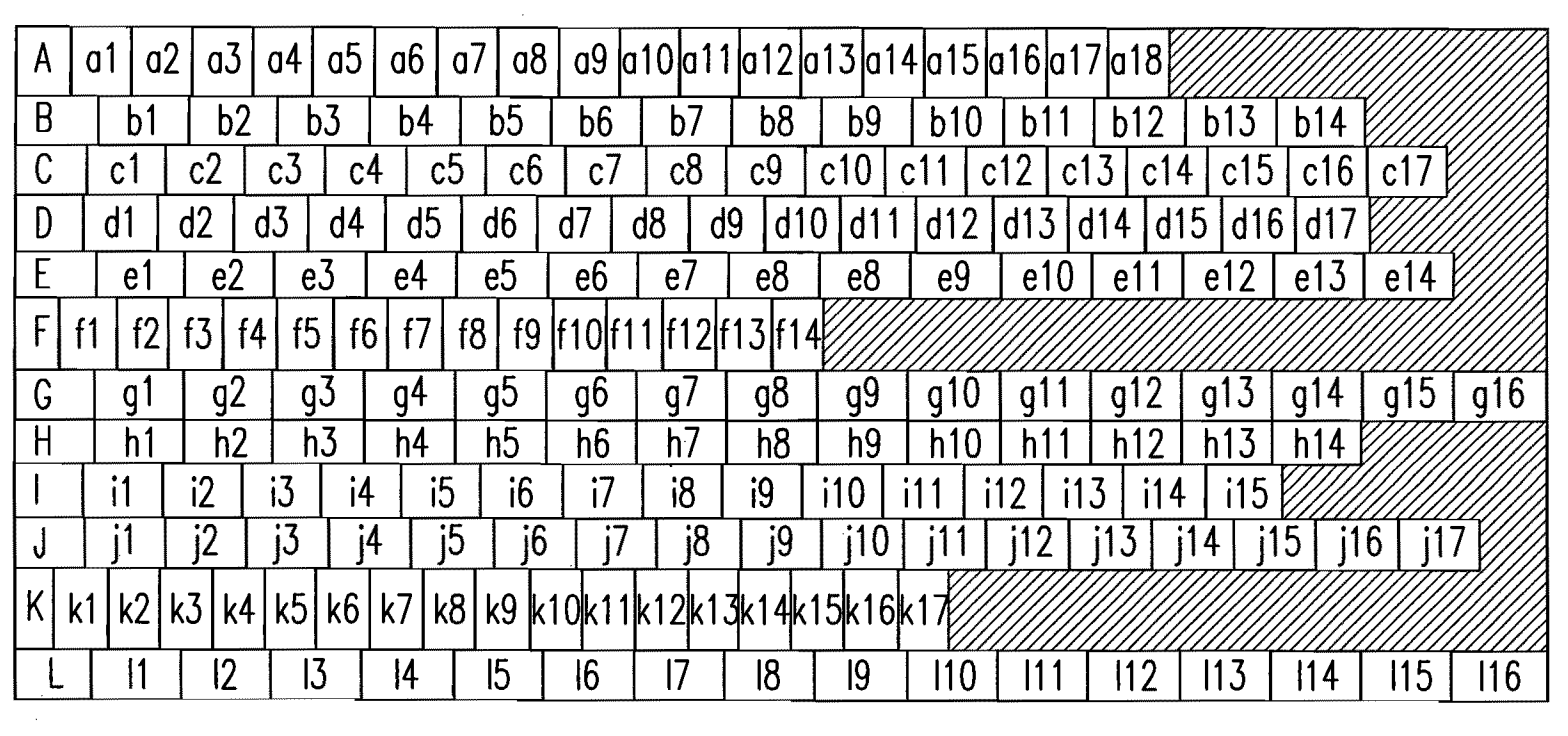

At this time, each principal trait corresponds to $k_j$ traits patterns. As shown in FIG. 1, a code book is constructed, wherein the first patch of each row expresses a principal trait, i.e. patch A is one of the principal traits, and patches A-L are all the principal traits in the code book. And all the patches started from the second patch in said row express all the trait patterns corresponding to said principal trait, i.e. patches a1, a2, a3, . . . , a18 are the trait patterns corresponding to the principal trait A; patches b1, b2, b3, . . . , b14 are the trait patterns corresponding to the principal trait B; and so on. Basically, 60 principal traits are enough to distinguish all the faces of the present mankind.

Please refer to FIG. 2. Next, a human face is provided (step 21), after the human face is received by a sensor, a facial image will be produced (step 22). At the present, using N classifiers to classify the N principal traits on the human face according to the code book, so as to determine which trait pattern these principal traits belong to. This is called the encoding (step 23). And then a facial trait code (step 24) is produced and stored in a database (step 25). The facial trait code is a serial code with N integer-numbered digits, wherein each value in the serial code is greater than or equal to 1. As the aforementioned, since 60 principal traits are enough, the length of the serial code can be set as 60 digits now. Certainly, what described here is only the preferred embodiment, it is also possible to define digit length arbitrarily based on the requirement. Afterward, a second human face is provided. Similarly, after classifying the second human face, the second facial trait code is acquired. If the abovementioned steps are continuously repeated, it is possible to encode all the users and construct independent and respective facial trait code in the database according to all the users.

Figure 3:
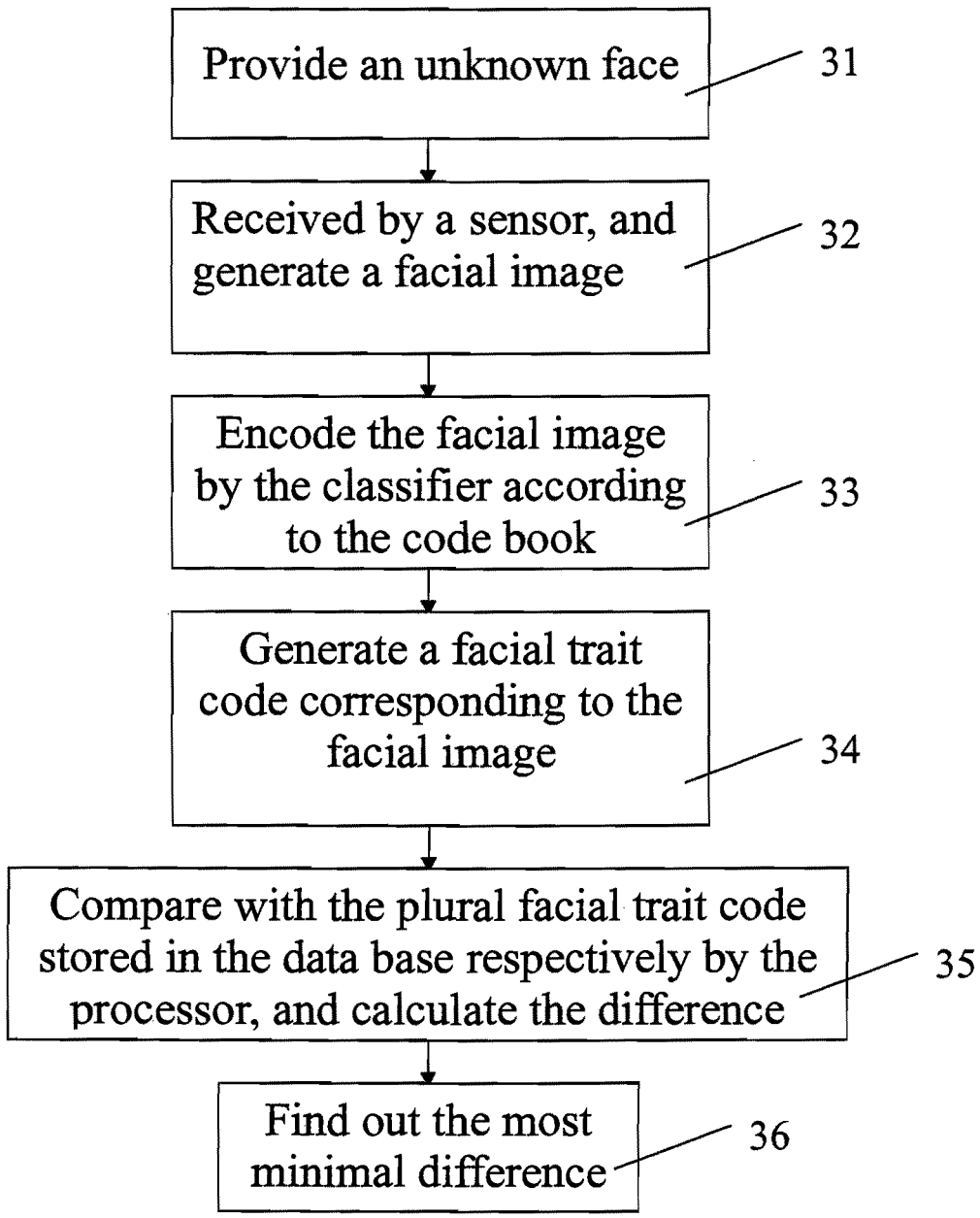
FIG. 3 is a flowchart showing part of the steps in the present invention.

Please refer to FIG. 3, if now recognizing an unknown user is wanted, it is necessary to encode the unknown user's face to obtain the facial trait code thereof. Firstly, an unknown human face is provided (step 31). After the unknown human face is received by the sensor, a facial image will also be produced (step 32). Next the facial image of the unknown human face is encoded by the classifier according to the code book in order to generate the facial trait code of the facial image (step 34). By a processor to compare the facial trait code with all the facial trait codes in the database, corresponding differences will be generated respectively (step 35), and the respective difference is the distance between any two facial trait codes. The respective distance can be a Hamming distance, Euclidean distance or Bhattacharyya distance, or one obtained from any other available method of distance measurement. The processor now will find out a specific facial trait code in the database that the minimal difference is the difference between the specific facial trait code and the unknown facial trait code (step 36), and thus the unknown face will be confirmed as the face represented by that specific facial trait code. Actually, if the difference calculated is too large, i.e., if the unknown human face is greatly different from all the faces stored in the database, it is possible to understand that the unknown person is not an authorized user.

Figure 4:
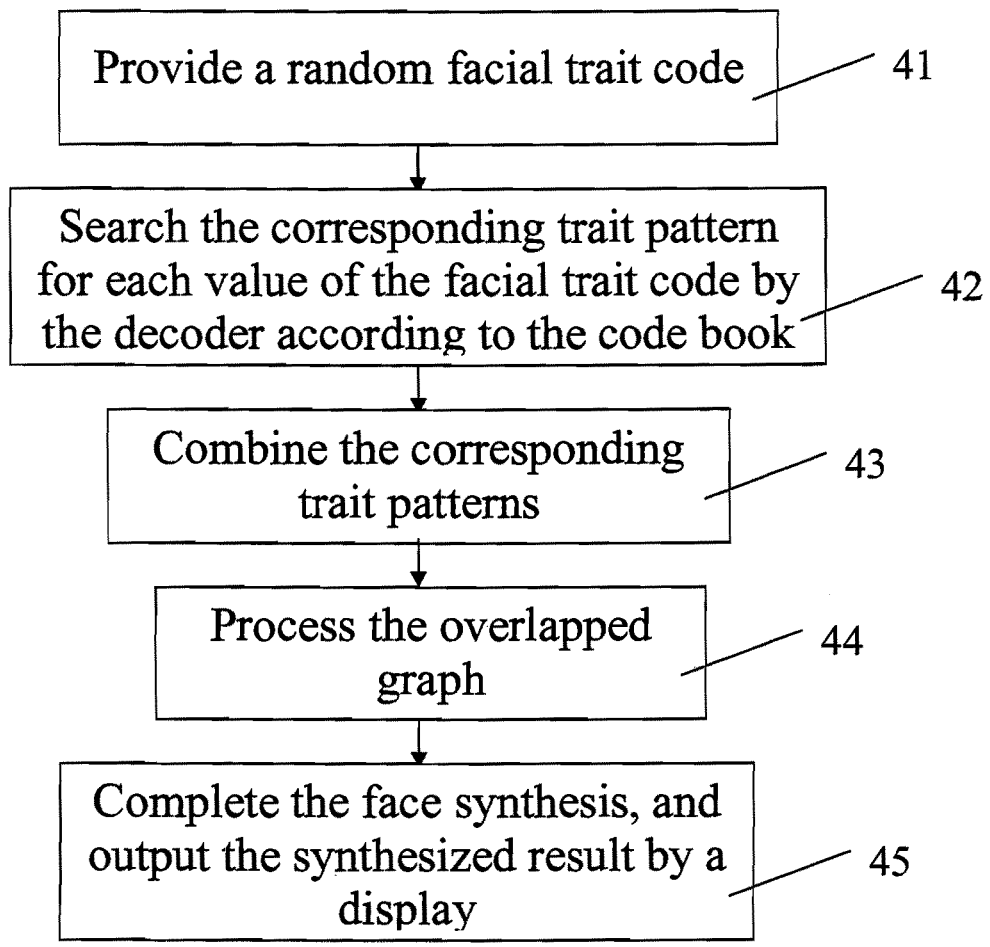
FIG. 4 is a flowchart showing part of the steps in the present invention.

Please refer to FIG. 4. By applying the concept of the facial trait code proposed by the present invention, the synthesis of human face can be made. First, a random facial trait code is provided (step 41), and the facial trait code is decoded by a decoder (step 42). According to the code book, it is possible to search the patch corresponding to each value of the facial trait code. For example, suppose a facial trait code [5, 2, 4, 7, . . . ] is provided, according to the code book in FIG. 1, the first value 5 is the fifth patch of trait pattern in the first row, which means the fifth patch a5 counted from the second patch a1. As a result, the second value 2 stands for the second patch b2 counted from the second patch b1 in the second row. By finding every trait pattern corresponding to each value, these patches of the facial trait code can be pieced up to synthesize a complete face (step 43). Since every trait pattern has its own specification, which is {w, h, x, y}, it is easy to realize which location on the face and how much area covered every principal trait does therefore. However, because of the possibly overlapped regions among all the trait patterns, a second processor is added to average the overlapped regions. That is to say, to average the pixels of the overlapped regions, and make the edge become softer (step 44), then the face synthesis is completed. In the consequence, the modified face would not have the situation that facial regions seem unconnected, and could be much closer to the real face. Finally, the synthesized result is outputted to a display (step 45), and it is possible to see what face that the random facial trait code stands for.

In the abovementioned method, the digits in the facial trait code are nature numbers, however, it is also possible to express in probability distribution. That is to say, each digit is an array indicating the probabilities of the corresponding patch belonging to every trait patterns exist in that digit, and can be defined as 1-by-$k_j$, and $k_j \leq K$. For example, suppose a facial trait code [a, b, c, . . . ] is provided, according to the code book in FIG. 1, the first digit "a" is a 1-by-18 real array [a1', a2', a3', . . . , a18'], wherein each element in this array is greater than or equal to zero and smaller than or equal to one. Similarly, the second digit "b" is a 1-by-14 real array according to the code book. In this respect, this type of facial trait code becomes much more precise, objective and distinguishing since this facial trait code can clearly provide an information that how each principle trait, expressed as each corresponding digit in this facial trait code, that the person differs from each one of the patches stored in the database, and therefore could prevent from the situation that the method arbitrarily decides and picks up the patch from certain very similar ones.

And when given this type of facial trait code to synthesize, since each element in the array is in probability form, to acquire the first patch based on the first digit, every patch in the first row of the code book corresponding to the first digit is weighted according to each corresponding element in the first array, or also called the first digit. As a result, the acquired patch after weighted would be much more close and real to the principal trait that the person has, and the final result of synthesizing each acquired patch would be much more precise and close to the person that the given facial trait code is expressed.

To sum up, the method proposed by the present invention classifies a human face into multiple principal traits, which construct the concept of facial trait code, not only can precisely recognize the human face but it can also be applied to the field of face synthesis. Besides, since the determined principal traits of the human face themselves have the best error-correcting ability according to the theory of Error Correcting Code, even part of trait patterns in a facial trait code is wrongly recognized, the final result can still be a correctly recognized face.

In addition, since the facial trait code of the present invention is a serial code or sequence composed of numbers, when comparing two facial trait codes, it is only necessary to compare the numbers on the same location respectively. As a result, the processing speed is so fast that is almost unaffected by the increasing of data stored in the database. Especially, the facial trait code is a serial code with 60 digits, therefore compared with the huge amounts of data generated from the traditionally complicated face processing and calculating method, the present invention possesses the superiority of simplification and high efficiency.

The method proposed by the present invention is not limited in using what kind of classifier. Basically every classifier available right now can be applied in the present invention, and therefore the possibility of the application scope of the present invention can be widened.

Furthermore, the application of the present invention is not only limited in human face recognition. It is possible to apply the technique in recognizing animal face, or other objects as well. More specifically, the present invention can be applied in recognizing the object in an image, wherein the object has a fixed or immovable nature in order to ensure that the general contour of the object remains the same.

As a result, the core of the present invention, the facial trait code, or the trait code, can also apply to other fields. That is to say, by substituting the human faces in the abovementioned method or process to the object, it is possible to generate the trait code of any object being recognized, and thus broaden the application scope of the present invention except for the face recognition.

While the invention has been described in terms of what is presently considered to be the most practical and preferred embodiment, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method of recognizing an object in an image, comprising steps of:
    providing the image having the object, and encoding principal traits of the object in order to generate a first trait code;
    comparing the first trait code with data stored in a database so as to obtain a plurality of differences; wherein the database is constructed by steps of:
    collecting K images, wherein each object in each of the K images has M traits;
    classifying each of the M traits so that the each trait of the K objects is classified into ki trait patterns, wherein i=1, 2, ..., M, and ki≦K;
    extracting N principal traits from the M traits, wherein each principal trait includes classified kj trait patterns, and wherein j=1, 2, ..., N, and kj≦K;
    constructing a code book based on the N principal traits and the kj trait patterns; and
    finding a minimum of the plurality of differences.

2. The method according to claim 1, further comprising a step of:
    providing of a plurality of comparison objects, and encoding the principal traits of each of the comparison objects based on the code book in order to generate a respective second trait code for the each comparison object.

3. The method according to claim 2, wherein each of the first and the second trait codes is a serial code, each of its digits can be a natural number or a 1-by-kj real array, and kj≦K.

4. The method according to claim 3, wherein each of the differences is a distance between the first and the second trait codes, and the distance comprises one selected from a group consisting of the Hamming distance, Euclidean distance and Bhattacharyya distance.

5. The method according to claim 2, wherein the first and the second trait codes are encoded by a classifier.

6. The method according to claim 1, wherein the principal trait is a region expressed as {w, h, x, y}, w is a width, h is a height, x is a horizontal coordinate, and y is a vertical coordinate.

7. A method for synthesizing an object in an image, comprising steps of:
    constructing a database including a plurality of patches, comprising sub-steps of:
    collecting K images, wherein each object in each of the K images has M traits;
    classifying each trait of the M traits so that the each trait of the K objects is classified into ki trait patterns, wherein i=1, 2, ..., M, and ki≦K;
    extracting N principal traits from the M traits, wherein each principal trait includes classified kj trait patterns, and wherein j=1, 2, ..., N, and kj≦K; and
    constructing a code book based on the N principal traits and the kj trait patterns;
    providing a trait code being a serial code having at least a value;
    finding the patch corresponding to each of the values in the serial code; and
    combining the corresponding patches.

8. The method according to claim 7, wherein the principal trait is a region expressed as {w, h, x, y}, w is a width, h is a height, x is a horizontal coordinate, and y is a vertical coordinate.

9. The method according to claim 7, wherein the step of combining the corresponding patches further comprises a step of performing an image processing for the corresponding patches.

10. A method of training a trait code, comprising steps of:
    collecting K images having an object respectively, each object has M traits;
    classifying each of the M traits so that the each trait of the K objects is classified into $k_i$ trait bases, wherein i=1, 2, ..., M, and $k_i$≦K;
    extracting N principal traits from the M traits, wherein each of the principal traits includes classified $k_j$ traits bases, and wherein j=1, 2, ..., N, and $k_j$≦K;
    constructing a code book based on the N principal traits and the $k_j$ trait bases; and
    providing of a plurality of comparison objects, and encoding the principal traits of each of the comparison objects based on the code book in order to generate the respective trait code for the each comparison object.

11. The method according to claim 10, wherein the trait code is encoded by a classifier.

12. The method according to claim 10, wherein the principal trait is a region expressed as {w, h, x, y}, w is a width, h is a height, x is a horizontal coordinate, and y is a vertical coordinate.

13. A recognizing and synthesizing system of an object in an image, comprising:
    a database having a trained code book;
    a sensor receiving a first image;
    a classifier classifying and encoding a first object in the first image; and
    a processor comparing the result of encoding with the trained code book of the database,
    wherein the database is constructed by:
    collecting K images, wherein each object in each of the K images has M traits;
    classifying each of the M traits so that the each trait of the K objects is classified into $k_i$ trait patterns wherein i=1, 2, ..., M and $k_i$≦K;
    extracting N principal traits from the M traits, wherein each principal trait includes classified $k_j$ trait patterns and wherein j=1, 2, ..., N and $k_j$≦K; and
    constructing the trained code book based on the N principal traits and the $k_j$ trait patterns.

14. The system according to claim 13, wherein the classifier generates a first trait code for the first object based on the trained code book, and the first trait code is stored in the database.

15. The system according to claim 14, wherein the sensor further receives plural images, the classifier generates plural trait codes for each of the plural objects in the plural images respectively based on the trained code book, and the processor compares the first trait code with each of the plural trait codes to find differences and a minimum of the differences.

16. The method according to claim 15, wherein the first trait code is a serial code, each of its digits can be a natural number or a 1-by-kj real array, and $kj \leq K$.

17. The system according to claim 15, wherein each of the differences is a distance between the first and the each trait code, and the distance comprises one selected from a group consisting of the Hamming distance, Euclidean distance or Bhattacharyya distance.

18. The system according to claim 13, further comprising:
   a decoder decoding a second trait code based on the trained code book to generate a second image having a second object; and
   a monitor outputting the second image.

19. The system according to claim 13, further comprising a second processor modifying the second image.

20. The method according to claim 1, wherein the extraction of N principal traits from the M traits is done by using an Adaboost algorithm.

\* \* \* \* \*